July 3, 1956
G. P. REINTJES
2,753,172
MULTIPLE PASS CHECKERWORK
Filed March 9, 1953
2 Sheets-Sheet 1
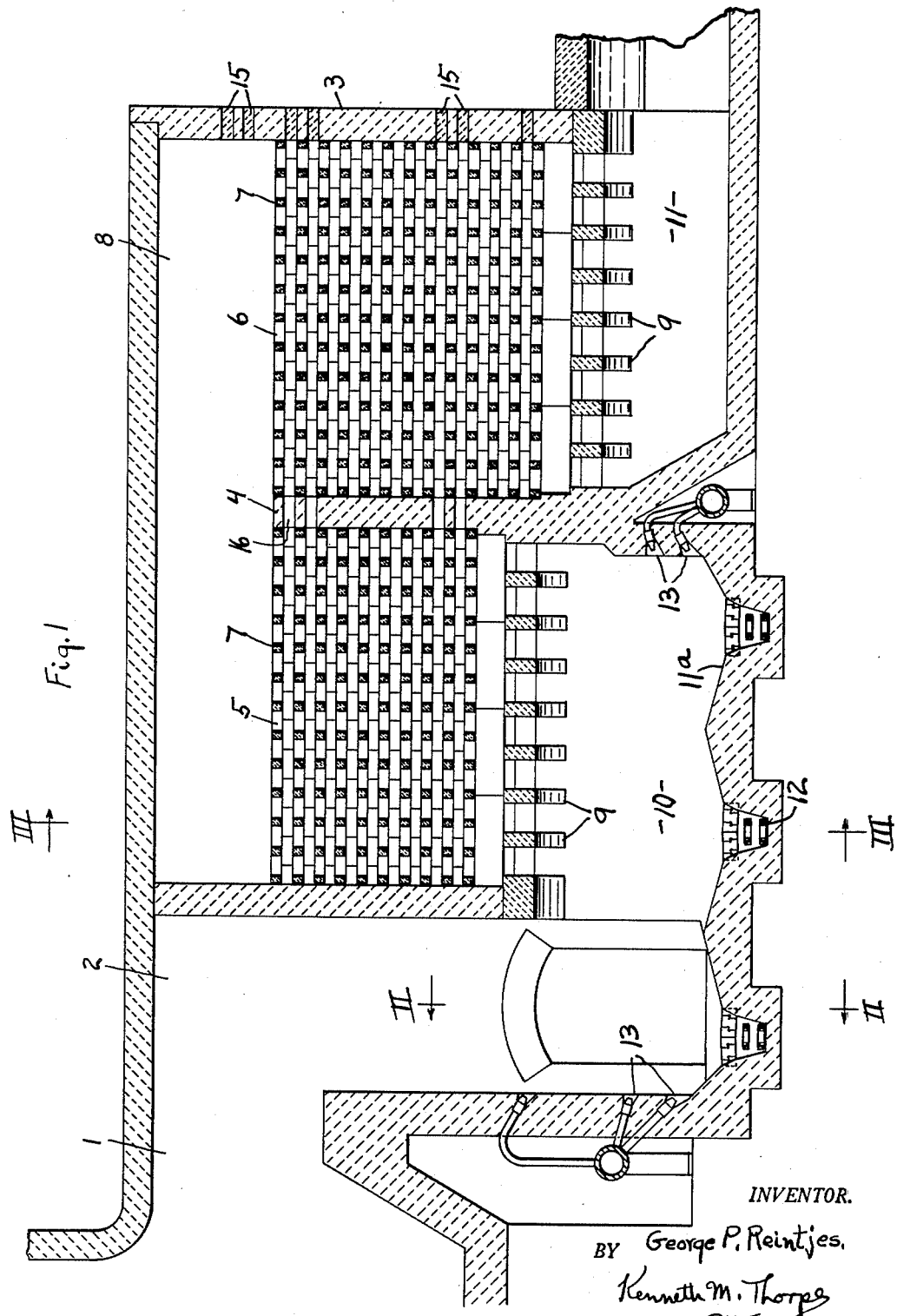
INVENTOR.
BY George P. Reintjes.
Kenneth M. Thorpe
Atty.

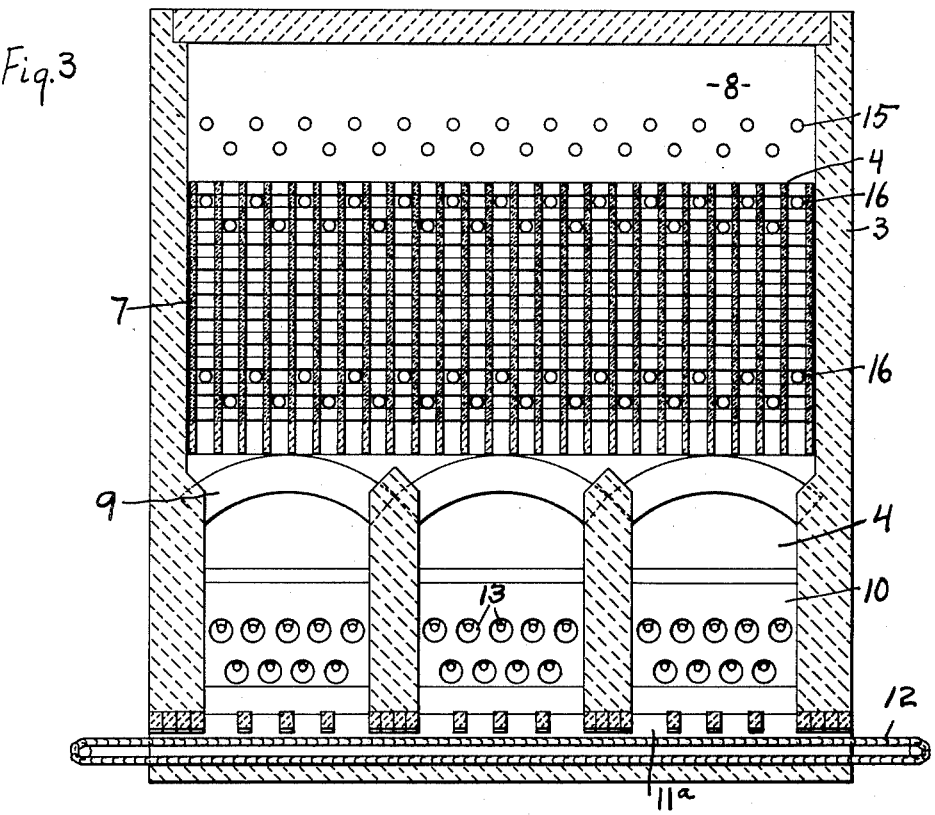
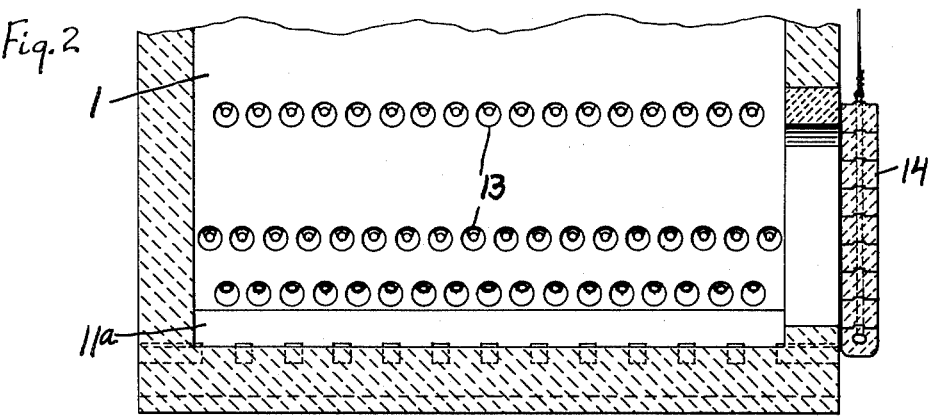

United States Patent Office 2,753,172
Patented July 3, 1956

2,753,172

MULTIPLE PASS CHECKERWORK

George P. Reintjes, Kansas City, Mo.

Application March 9, 1953, Serial No. 341,109

1 Claim. (Cl. 263—51)

This invention relates to checkerwork used as heat recovery means in connection with open-hearth and other regenerative furnaces. In many locations it is necessary to install what are known as two-pass checkerworks because of a high water table or similar physical limitations prevent installation of a conventional checkerwork having passes of sufficient vertical height. Two-pass checkerwork, however, have not proven entirely satisfactory as the necessary limitation in cross-sectional area of each pass, causes the first pass to be overworked due to slagging or soot deposits, which in turn cause burning out and erosion of the refractories. The gases soon tunnel through the checkerwork and its efficiency is lost. Inefficient checkerwork leads to the waste of thousands of dollars in fuel bills.

One of the chief causes of the above conditions has been found to lie in the lack of suitable means to remove solids entrained by the hot gases discharged from the furnace before such gases enter the checkerwork flues. To remedy this situation the present invention contemplates providing an auxiliary slag pocket below the first pass and then in feeding the gas upwardly through the first pass after it has been more or less cleaned through dropping its solids in the slag pocket. By this means the cross sectional area of the checkerwork will be maintained relatively clean or sharp and its heat absorbing and discharging efficiency will be maintained and there will be no great concentration of gases to one area caused by the partial clogging of other areas.

Another object of the invention is to provide a two-pass checkerwork in which both passes are in the same chamber, but separated by a relatively narrow wall for space conservation purposes.

A further object of the invention is to provide a two-pass checkerwork of such nature that both passes may be cleaned from one end of the furnace.

A still further object of the invention is to provide a construction in which slag reducing agents such as air or fluids under pressure may be injected into the chamber to break up or desolidify the slag and cause its deposit in more or less comminuted form so that it will not adhere in large masses which must be broken up by jack-hammers and the like. In some situations the injection means may be used to admit air or oxygen to supplement the heated air for combustion.

With the general objects named in view and others as will hereinafter appear, the invention consists in certain novel and useful features of construction and organization of parts as hereinafter described and claimed; and in order that it may be fully understood, reference is to be had to the accompanying drawings, in which:

Figure 1 is a longitudinal section through a portion of one end of an open-hearth furnace and checkerwork embodying the invention.

Figure 2 is a section on the line II—II of Figure 1.

Figure 3 is a section on the line III—III of Figure 1.

In the said drawings, where like reference characters identify corresponding parts in all of the figures, 1 represents one end of an open-hearth furnace which discharges into a passageway 2. Connected to the passageway 2 at any suitable point is a checkerwork chamber 3, said chamber having bottom, top and side walls, and having a partition wall 4 dividing it into two passes 5 and 6 filled with refractories 7 providing vertical flues as common in the art. The wall 4 extends from the bottom of the chamber to a point below the top or roof and provides a gas turn chamber 8.

The checkerwork of passes 5 and 6 are supported on arches 9 above the floor. Thus, underlying chambers or entry ports 10 and 11 are provided which are respectively connected to the discharge passageway 2 of the furnace and to the furnace stack, not shown. The port 10 forms a slag chamber in which solids are separated from the gases before the gases turn upwardly through the first pass, such separation taking place by gravity and centrifugal effect. Where jets are introduced as hereinafter described, natural or gravitative separation may be assisted.

The bottom of the chamber or port 10 may be provided with a series of slag and dust pockets 11a in which conveyors 12 may be mounted for withdrawal of the deposited material. If desired, the walls of the chamber 10 may be formed with air, fluid or liquid discharging jets or ports 13 through which slag reducing agents may be injected constantly or intermittently, as desired. Also, under some conditions, it may be desirable to supply air or oxygen for combustion purposes.

One of the side walls of the furnace may be provided with a door opening normally closed by a door or gate 14, through which access may be had to the slag compartment for cleaning or repair. In order that the checkerwork may be cleaned a series of openings 15 are formed in one end wall of the chamber, and alined with said openings are corresponding openings 16 in the partition 4. With this arrangement lancing devices may be inserted into the furnace for cleaning the vertical flues with liquid or fluid jets, such as, steam, water, air, or a combination of the same with chemical cleaning agents.

From the above description and drawings it will be apparent that I have produced a construction embodying all of the features of advantage set forth as desirable; and which I have described and illustrated the preferred embodiment, it is to be understood that I reserve the right to all changes within the spirit and scope of the appended claim.

I claim:

The combination in a furnace and checkerwork chamber, a down-pass receiving the hot gases from the furnace, a horizontal turn-chamber connected to the lower end of the down-pass, a series of spaced arches spanning said chamber, a checkerwork carried by the arches through which the hot gases pass upwardly, a second checkerwork connected to the upper end of the first checkerwork, a ported wall separating said chambers, and exterior ports in the second chamber alined with the wall ports for horizontal lancing of the two chambers.

References Cited in the file of this patent

UNITED STATES PATENTS

| 2,119,310 | Baughman | May 31, 1938 |
| 2,176,270 | Morton | Oct. 17, 1939 |
| 2,267,933 | Lindemuth | Dec. 30, 1941 |
| 2,559,350 | Drake | July 3, 1951 |
| 2,661,198 | Brashear | Dec. 1, 1953 |

OTHER REFERENCES

Etherington's "Modern Furnace Technology," published by Charles Griffin and Company, Limited, 42 Drury Lane, W. C. 2, London, England, 1938, pages 366, 367 and 368.